Jan. 1, 1929.  
E. A. HINES  
1,697,841
AUTO SIGNALING MECHANISM
Filed June 17, 1921
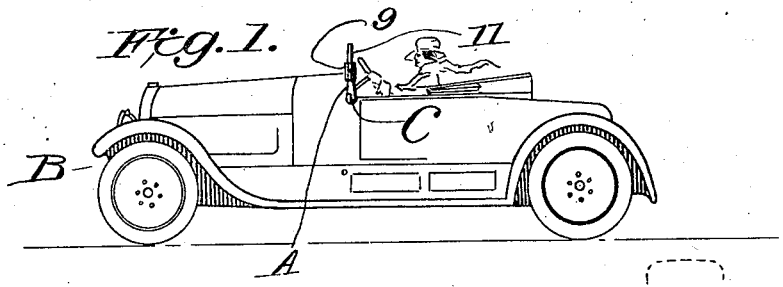
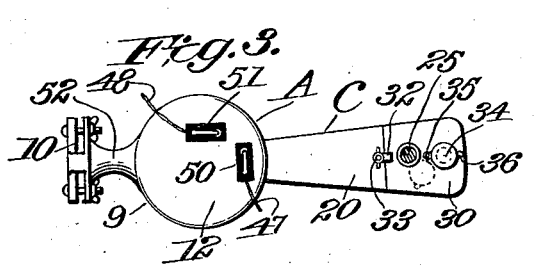
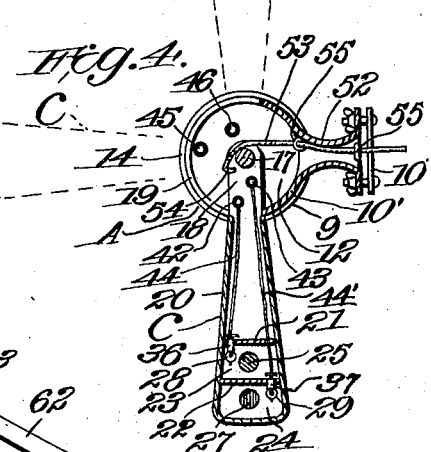
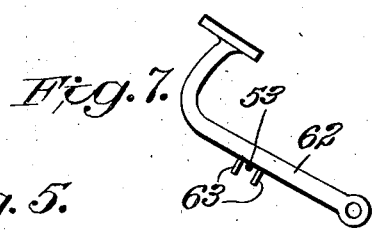
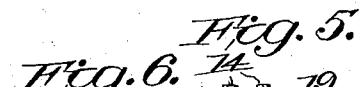
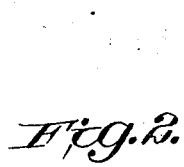
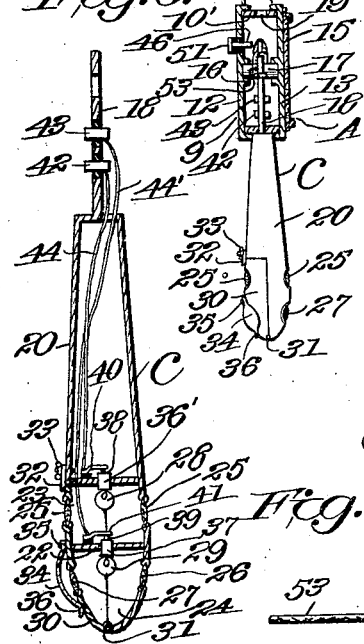
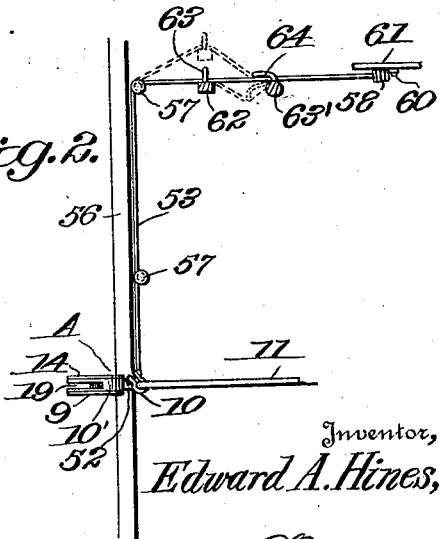
Inventor,  
Edward A. Hines,  
By  
Attorney.

Patented Jan. 1, 1929.

1,697,841

UNITED STATES PATENT OFFICE.

EDWARD A. HINES, OF WASHINGTON, DISTRICT OF COLUMBIA, ASSIGNOR TO ROBERT A. GUNN, OF WASHINGTON, DISTRICT OF COLUMBIA.

AUTO SIGNALING MECHANISM.

Application filed June 17, 1921. Serial No. 478,354.

This invention relates to a traffic signal designed particularly for use on automobiles or other vehicles.

One major object is to provide a signal of this nature having a signaling arm movable to simulate the movement of the human arm preparatory to turning or stopping the vehicle.

Other important objects are to provide a signal which is operable through the movement of the steering mechanism and also by the application of the brake of the automobile to which it is attached; and to provide a means to throw the same signaling arm to different positions by application of the brake and movement of the steering mechanism.

Subordinate objects and advantages will appear hereinafter from the description of the present preferred embodiment which is illustrated in accompanying drawings, wherein:—

Figure 1 is a side elevation of an automobile equipped with my improved signal.

Figure 2 is a diagrammatic view illustrating the signal in plan and in connection with automobile parts with which it is associated.

Figure 3 is rear elevation of the signal with the semaphore or signaling arm in horizontal position to indicate a "turn".

Figure 4 is a substantially central vertical section through the signal with the semaphore in normal position in full lines, and in signaling position in dotted lines.

Figure 5 is substantially a vertical sectional view through the signal taken at right angles to Figure 4, but with the semaphore in elevation.

Figure 6 is a vertical sectional view, on an enlarged scale, through the semaphore.

Figure 7 is a detail side elevation of the brake pedal and its connection to the draw cable.

Figure 8 is a fragmentary elevation of the steering wheel and rod illustrating its connection to the draw cable.

Similar reference characters designate corresponding parts through the several figures of the drawings.

In the drawings, a signal device generally indicated A is mounted at any desired location on the automobile B or other vehicle. This device has a casing 9 provided with any suitable form of clamp 10 which preferably engages the marginal frame of the windshield 11 of the vehicle. By its attachment to the wind-shield, it will be in an effective signaling position on either open or closed vehicles.

Said casing 9 comprises an annular rim 10' having its ends covered by closure plates 12 and 13 which are preferably screwed thereto by means of flanges 14. The plate 13 forms a convenient means upon which a reflector or mirror 15 may be mounted in any suitable manner. Sockets 16 are provided on the plates 12 and 13 to mount a short shaft 17 upon which a semaphore or signaling arm C is journaled. Semaphore C has an arm 18 which extends through an elongated slot 19 provided in the rim 10' to enable the semaphore to assume the various positions suggested in Figure 4. Exterior of the casing, the signaling arm or semaphore is a hollow body 20. Partitions 21 and 22 are provided in the signaling arm to form compartments 23 and 24. In the front and rear walls of body 20, lenses 25 of any suitable construction are mounted in any desired manner. In the rear wall of body 20 at compartment 24, a lens 26 is mounted, while in the front wall of the body opposite lens 26, a lens 27 is disposed. Lenses 25 are preferably green, lens 26 is preferably red and lens 27 is preferably white. Within compartment 23 a suitable lamp 28 is disposed while a similar lamp 29 is positioned in the compartment 24. In order to permit access to the interior of compartments 24 and 25, body 20 preferably has a section 30 capable of opening from a hinge or pivot 31 and which section is normally closed by means of a latch 32 which overlaps the same and is securely fastened through the adjustment of the nut of a bolt 33 mounted in the body.

In order to normally conceal the lens 27, a shutter 34 is disposed thereover, pivoted at 35 so as to be swung to a position to expose said lens. This shutter may have a depression at 36 to enter a corresponding recess in the section 30 to normally remain therein through spring action of the shutter, to prevent swinging thereof.

Lamps 28 and 29 are preferably electric bulbs removably mounted in sockets 36' and 37 secured in the walls 21 and 22 respectively. The casing A is grounded to the automobile frame so that the sockets 36' and 37 will be in conducting relation therewith. Said electric bulbs are in conducting relation with the sockets at one pole and the other poles thereof at 38 and 39 engage spring conductors 40 and 41, respectively. In arm 18, contacts 42 and 43 are positioned, and suitably insulated from the arm and from each other. A conductor 44 leads from contact 42 into the arm and to conductor 40, while a conductor 44' leads from contact 43 to conductor 41. Contacts 45 and 46 are suitably mounted in and insulated from the plate 12 and associated therewith are conductors 47 and 48 which lead to the pole of the battery of the automobile which is not grounded, or to parts in circuit therewith. In order that the circuits to the lamps 28 and 29 may be opened at desirable times, switches 50 and 51 may be interposed at any suitable location therein.

In the rear of rim 10' is a sleeve 52, preferably integral with the rim and directly mounting the bracket 10. Through the sleeve 52, an operating or draw cable 53 of suitable flexible construction passes and is fastened at one end to the arm 18 as at 54. Suitable guide members 55 through which the cable 53 passes are mounted within the sleeve 52. Cable 53 is directed, for instance, along a side beam 56 of the automobile chassis and trained over guide pulleys 57 mounted therefrom, and then passed transversely of the vehicle and connected to a spring 58 secured at 60 to any suitable part of the chassis, as at 61. Spring 58 is of the coil expansive type and normally retracted. The transverse portion of the cable cooperates with the brake pedal or lever of the automobile at 62, being disposed in front of said pedal and intermediate lugs 63 thereon. The steering rod at 63' has an elongated loop 64 through which said horizontal portion of the cable also passes.

In operation, when the steering rod 63' is turned to the left, loop 64 tensions the cable 53 so that it will swing the signaling arm C from shaft 17 to the horizontal position shown in full lines in Figure 3 and in dotted lines in Figure 4, which is the usual indication that a turn to the left is being made. If shaft 63' is turned to the right, signaling arm C will not be moved since the space of the loop 64 will permit such movement of the post 63' without tensioning the cable 53. If the brake 62 is applied, whether or not the vehicle is turning, cable 53 will be tensioned and move sufficiently to throw the signal arm C to the vertical position suggested by dotted lines in Figure 4. In the latter instance, movement of the arm C causes expansion of spring 58 to give the cable sufficient length. The tension of spring 58, however, is such that the spring will not expand when the steering rod 63' is operated.

In darkness, the lamp 28 is to be lighted when arm C reaches a horizontal position and to this end, with switch 47 closed, when arm C reaches the horizontal position, contacts 42 and 45 will engage to establish the circuit through lamp 28. On the other hand, when contacts 43 and 46 engage, upon arm C assuming the vertical dotted line position of Figure 4, the circuit will be established through lamp 29.

In the latter position, when the machine is parked, closure 34 may be swung to the dotted line position of Figure 3 so that the white lens 27 will be displayed at the front and red lens 26 will be displayed at the rear of the arm C to serve as a parking lamp.

I claim:—

1. In signaling mechanism, a movable signal, a flexible operating member therefor, means to operate said member to actuate the signal, a second means to operate said member to actuate the signal, and a contractile element to permit extension of said member incident to operation of said second means.

2. In signaling mechanism, a movable signal, a flexible operating member therefor, means to operate said member to actuate the signal, a second means to operate said member to actuate the signal, the second means moving said member in a direction different from the direction of its actuation by the first means, and a contractile element to permit extension of said member incident to operation of said second means.

3. In signaling mechanism, a movable signal, a flexible operating member therefor, means to exert a lateral drawing strain on said member to actuate the signal, means to exert a drawing strain on said member in a different path from the first means, and a contractile element to permit extension of said member incident to operation of said second means.

4. In signaling mechanism for a vehicle, a signal, a flexible operating member therefor, means operable to draw a portion of said member laterally through operation of a control element of the vehicle, and means operable to draw a portion of said member in a different direction from the first means through operation of another control element of the vehicle, the drawing of said member serving to actuate the signal.

5. In signaling mechanism, a pivoted signaling arm, a cable secured at one end thereto, means to secure the other end of the cable at a distance therefrom, an operating member to draw said cable, a second operating member to draw said cable, a spring connected to the cable, and said cable being drawn to a greater degree by the second operating member than by the first, and said spring being expanded by operation of the second operating member.

6. In signaling mechanism, a signaling means, a control member therefor, an operating member, and said operating member having means to operate the control member when turned in one direction and to move independent thereof when turned in the opposite direction.

7. In signaling mechanism, a signaling means, a cable extending therefrom, an operating member having a loop through which the cable passes, and said loop being elongated and having a part to engage the cable to draw it when the member moves in one direction, and to permit independent movement of the member relative to the cable when moved in the opposite direction.

Signed at Washington, D. C., this 15th day of April, 1921.

EDWARD A. HINES.